United States Patent
Song et al.

(10) Patent No.: US 9,588,273 B2
(45) Date of Patent: Mar. 7, 2017

(54) OPTICAL PATTERN SHEET, BACKLIGHT UNIT, AND LIQUID CRYSTAL DISPLAY HAVING THE SAME

(71) Applicant: Samsung Display Co., Ltd., Yongin, Gyeonggi-Do (KR)

(72) Inventors: Hyun Hwa Song, Suwon-si (KR); Do Hun Kim, Changwon-si (KR); Dong Hoon Kim, Suwon-si (KR); Joong Hyun Kim, Asan-si (KR); Sang Hoon Lee, Hwaseong-si (KR); Ji Won Lee, Hwaseong-si (KR); Seong Yong Hwang, Asan-si (KR)

(73) Assignee: Samsung Display Co., Ltd. (KR)

( * ) Notice: Subject to any disclaimer, the term of this patent is extended or adjusted under 35 U.S.C. 154(b) by 431 days.

(21) Appl. No.: 14/257,745

(22) Filed: Apr. 21, 2014

(65) Prior Publication Data

US 2015/0198756 A1    Jul. 16, 2015

(30) Foreign Application Priority Data

Jan. 13, 2014  (KR) ........................ 10-2014-0004010

(51) Int. Cl.
*F21V 8/00* (2006.01)
*G02B 5/02* (2006.01)
(Continued)

(52) U.S. Cl.
CPC ..... *G02B 6/0025* (2013.01); *G02F 1/133504* (2013.01); *G02F 1/133512* (2013.01);
(Continued)

(58) Field of Classification Search
CPC .. G02B 5/0215; G02B 5/0242; G02B 6/0025; G02F 2001/133322;
(Continued)

(56) References Cited

U.S. PATENT DOCUMENTS 7,720,347 B2 * 5/2010 Lee ...................... G02B 6/0038
349/56
8,684,547 B2 * 4/2014 Kim ...................... G02B 6/0055
313/113

(Continued)

FOREIGN PATENT DOCUMENTS

JP    2004-231736    8/2004
JP    2009-301912    12/2009
(Continued)

*Primary Examiner* — Dennis Y Kim
(74) *Attorney, Agent, or Firm* — Innovation Counsel LLP

(57) ABSTRACT

A backlight unit including an optical pattern sheet and a liquid crystal display are provided. The backlight unit includes a light guide plate, a light source portion arranged adjacent to a side surface of the light guide plate to emit light, a mold frame having an extension portion that covers an upper portion of the light source portion and a part of an upper portion of the light guide plate, and an optical pattern sheet arranged on a lower portion of the extension portion to shade or diffuse incident light, wherein the optical pattern sheet includes a base film and an optical pattern portion positioned on the base film.

12 Claims, 6 Drawing Sheets

(51) Int. Cl.
 *G02F 1/1333* (2006.01)
 *G02F 1/1335* (2006.01)
(52) U.S. Cl.
 CPC .......... *G02B 5/0215* (2013.01); *G02B 5/0242* (2013.01); *G02F 2001/133317* (2013.01)
(58) Field of Classification Search
 CPC ... G02F 2001/133317; G02F 1/133308; G02F 1/133504; G02F 1/133512
 See application file for complete search history.

(56) References Cited

U.S. PATENT DOCUMENTS

| | | | |
|---|---|---|---|
| 2007/0147763 A1* | 6/2007 | Abu-Ageel | G02B 6/06 385/133 |
| 2010/0027294 A1* | 2/2010 | Lee | G02B 5/045 362/620 |
| 2010/0302479 A1* | 12/2010 | Aronson | B29D 11/00326 349/64 |
| 2011/0249217 A1 | 10/2011 | Park et al. | |
| 2011/0286202 A1* | 11/2011 | Kim | G02B 6/0055 362/97.1 |
| 2012/0218696 A1* | 8/2012 | Kim | G02F 1/133308 361/679.01 |
| 2012/0257417 A1* | 10/2012 | Lee | G02B 6/005 362/622 |
| 2014/0085569 A1* | 3/2014 | Choi | G02F 1/133606 349/64 |

FOREIGN PATENT DOCUMENTS

| | | |
|---|---|---|
| JP | 2012-215621 | 11/2012 |
| KR | 10-2008-0052775 | 6/2008 |
| KR | 10-0853669 | 8/2008 |
| KR | 10-2008-0085595 | 9/2008 |
| KR | 10-2010-0078658 | 7/2010 |
| KR | 10-2010-0078681 | 7/2010 |
| KR | 10-2011-0019823 | 3/2011 |
| KR | 10-2012-0102212 | 9/2012 |

* cited by examiner

OPTICAL PATTERN SHEET, BACKLIGHT UNIT, AND LIQUID CRYSTAL DISPLAY HAVING THE SAME

CROSS-REFERENCE TO RELATED APPLICATIONS

This application is based on and claims priority to Korean Patent Application No. 10-2014-0004010, filed on Jan. 13, 2014 in the Korean Intellectual Property Office, the disclosure of which is incorporated herein in its entirety by reference.

BACKGROUND

1. Field

The inventive concept relates to an optical pattern sheet, a backlight unit, and a liquid crystal display having the same.

2. Description of the Prior Art

In general, a liquid crystal display has advantages of thin thickness, light weight, and low power consumption, and is used in a monitor, a notebook computer, a portable phone, or a large-scale TV. The liquid crystal display includes a liquid crystal display panel displaying an image using variable light transmittance of liquid crystals, and a backlight unit arranged on a lower portion of the liquid crystal display panel to provide light to the liquid crystal display panel.

The backlight unit is classified into a direct type and an edge type according to arrangement of a light source. The edge type backlight unit has a structure in which the light source is arranged on a side portion of a light guide plate, and the direct type backlight unit has a structure in which the light source is arranged on a lower portion of a display panel.

The direct type backlight unit has limitations in terms of weight and thickness. Recently, in order to implement a light and thin liquid crystal display, researches for an edge type backlight unit have been actively made. In addition, since a wide display area is demanded in a liquid crystal display, a narrow bezel design for reducing the width of an outer edge of the liquid crystal display, which is a non-display region except for a display region where an image is displayed, has been developed.

However, such a narrow bezel design may cause the occurrence of bright line and light leakage of the liquid crystal display.

SUMMARY

Accordingly, one subject to be solved by the inventive concept is to provide an optical pattern sheet, a backlight unit, and a liquid crystal display having the same, which can not only reduce a bezel width but also prevent the occurrence of bright line and light leakage, and thus can improve luminance and picture quality.

Additional advantages, subjects, and features of the inventive concept will be set forth in part in the description which follows and in part will become apparent to those having ordinary skill in the art upon examination of the following or may be learned from practice of the inventive concept.

In one aspect of the inventive concept, there is provided a backlight unit. The backlight unit comprises: a light guide plate, a light source portion arranged adjacent to a side surface of the light guide plate to emit light, a mold frame having an extension portion that covers an upper portion of the light source portion and a part of an upper portion of the light guide plate, and an optical pattern sheet arranged on a lower portion of the extension portion to shade or diffuse incident light, wherein the optical pattern sheet includes a base film and an optical pattern portion positioned on the base film.

In another aspect of the inventive concept, there is provided an optical pattern sheet. The optical pattern sheet comprises: a base film, and an optical pattern portion positioned on the base film to shield or diffuse incident light.

In still another aspect of the inventive concept, there is provided a liquid crystal display. The liquid crystal display comprises: a light guide plate, a light source portion arranged adjacent to a side surface of the light guide plate to emit light, a mold frame having an extension portion that covers an upper portion of the light source portion and a part of an upper portion of the light guide plate, an optical sheet positioned on the light guide plate and seated on the extension portion, a display panel positioned on the optical sheet and including a display region and a non-display region, and an optical pattern sheet arranged on a lower portion of the extension portion to shield or diffuse incident light, wherein the optical pattern sheet includes a base film and an optical pattern portion positioned on the base film, and at least a part of the extension portion overlaps the display region.

According to the aspects of the inventive concept, at least the following effects can be achieved.

The bezel width of the backlight unit and the liquid crystal display can be reduced.

Further, since the bezel width can be reduced and the bright line and the light leakage can be prevented, the luminance and the picture quality can be improved.

The effects according to the inventive concept are not limited to the contents as exemplified above, but further various effects are included in the description.

BRIEF DESCRIPTION OF THE DRAWINGS

The above and other objects, features and advantages of the inventive concept will be more apparent from the following detailed description taken in conjunction with the accompanying drawings, in which.

DETAILED DESCRIPTION OF THE EMBODIMENTS

Figure 1:
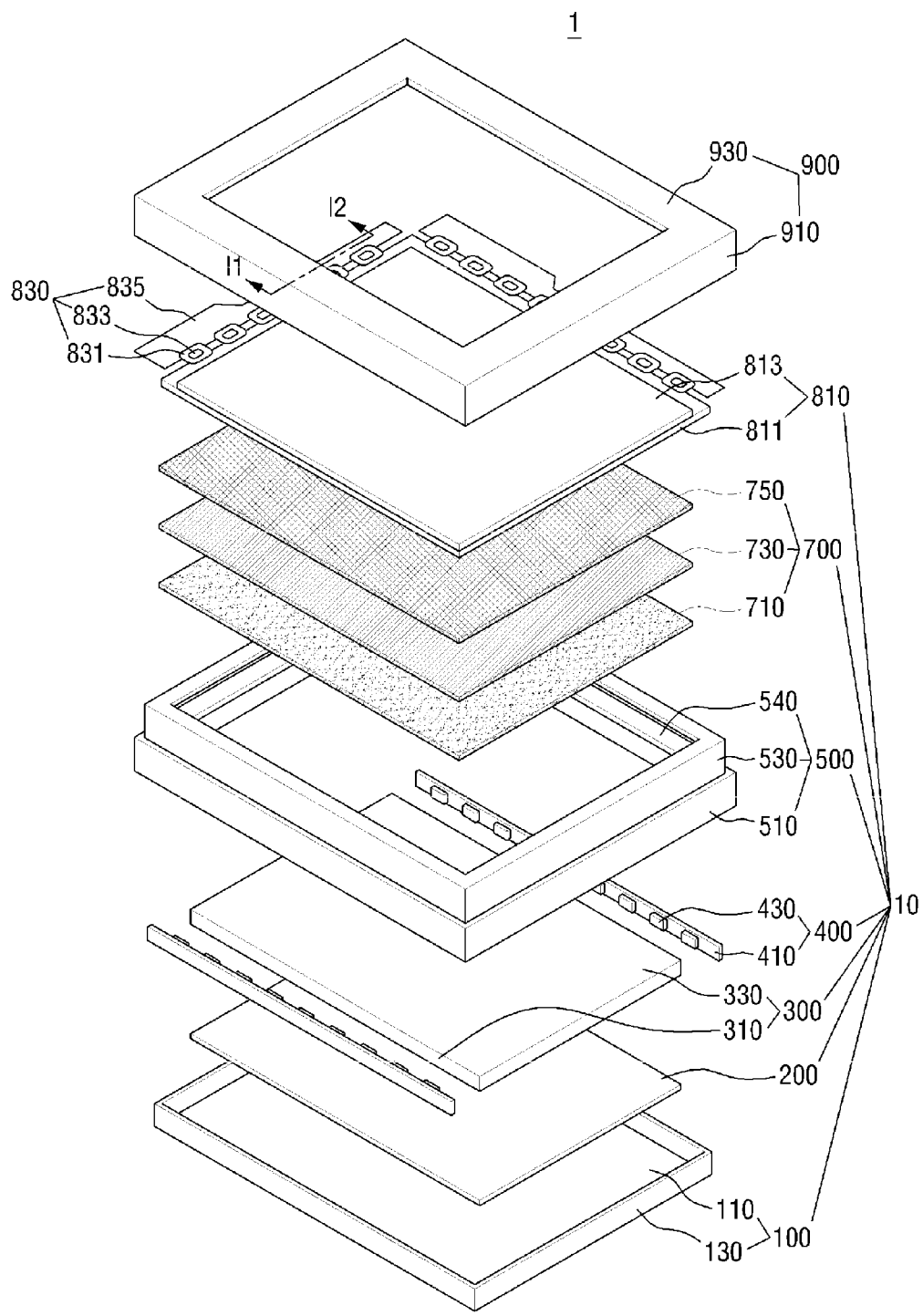
FIG. 1 is an exploded perspective view of a backlight unit and a liquid crystal display according to an embodiment of the inventive concept.

Advantages and features of the inventive concept and methods of accomplishing the same may be understood more readily with reference to the following detailed description of exemplary embodiments and the accompanying drawings. The inventive concept may, however, be embodied in many different forms and should not be construed as being limited to the exemplary embodiments set forth herein. Rather, these exemplary embodiments are provided so that this disclosure will be thorough and complete and will fully convey the concept of the inventive concept to those skilled in the art, and the inventive concept will only be defined by the appended claims. Like numbers refer to like elements throughout. In the drawings, sizes and relative sizes of layers and regions may be exaggerated for clarity.

It will be understood that when an element or layer is referred to as being "on" another element or layer, it may be formed directly on the other element or layer, or be formed with intervening elements or layers.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Like reference numerals refer to like elements throughout the specification.

Embodiments of the inventive concept are described herein with reference to plan and cross-section illustrations that are schematic illustrations of idealized embodiments of the inventive concept. As such, variations from the shapes of the illustrations as a result, for example, of manufacturing techniques and/or tolerances, are to be expected. Thus, embodiments of the inventive concept should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the inventive concept.

It will be understood that, although the terms first, second, third, etc., may be used herein to describe various elements, these elements should not be limited by the terms used. The terms are only used to distinguish one element from another element. Thus, a first element could be termed as a second element without departing from the teachings of the inventive concept.

The terminology used herein is for the purpose of describing particular embodiments only and is not intended to limit a claim scope. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term, "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

Hereinafter, embodiments of the inventive concept will be described with reference to the accompanying drawings.

FIG. 1 is an exploded perspective view of a backlight unit and a liquid crystal display according to an embodiment of the inventive concept.

Referring to FIG. 1, a liquid crystal display 1 according to an embodiment of the inventive concept may include a display panel 810, an upper reception member 900 positioned on an upper portion of the display panel 810, and a backlight unit 10 positioned on a lower portion of the display panel 810.

The display panel 10 plays a core role in performing image display of the liquid crystal display 1, and may include first and second substrates 811 and 813, of which surfaces are attached to each other, and a liquid crystal layer (not illustrated) interposed between the two substrates.

Here, although not illustrated in the drawing, on an inner surface of the first substrate 811 that is typically called as a lower substrate, a thin film transistor substrate, or an array substrate, a plurality of gate lines and data lines may cross each other. A thin film transistor (TFT) may be provided at each cross point to be connected to a transparent pixel electrode formed on each pixel in a one-to-one manner. Further, on an inner surface of the second substrate 813 that is called as an upper substrate or a color filter substrate, red (R), green (G), and blue (B) color filters that correspond to each pixel and black matrices positioned between the color filters to cover the gate lines, the data lines, and the thin film transistors may be provided. Further, on the second substrate 813, a transparent common electrode that covers the red (R), green (G), and blue (B) color filters and the black matrices may be provided.

To outer sides of the first and second substrates 811 and 813, polarizing films (not illustrated in the drawing) that selectively transmit specific light may be attached. The polarizing film transmits only light that oscillates in the same direction as a polarizing axis among light provided from the backlight unit 10 of the liquid crystal display 1, and absorbs or reflects light that oscillates in other remaining directions to provide light that oscillates in a specific direction.

Here, the polarizing film may be formed of any one of polyvinyl alcohol, polycarbonate, polystyrene, and poly (methyl methacrylate). For example, the polarizing film may be obtained by drawing and soaking a polyvinyl alcohol film in dichroic dyes solution with iodine and aligning iodine molecules and dyes molecules in a line in a drawing direction. In this case, since the iodine molecules and the dyes molecules have dichroism, the light that oscillates in the drawing direction of the polarizing film is absorbed, and the light that oscillates in the vertical direction permeates the polarizing film.

A driver 830 for applying a driving signal may be provided on one side of the first substrate 811. The driver 830 may include a flexible printed circuit board (FPC) 831, a driving chip 833 mounted on the FPC 831, and a circuit board 835 connected to one side of the flexible printed circuit board 831.

The driving chip 833 may include a data driving circuit or a gate driving circuit. If a thin film transistor selected by gate lines is turned on by an on/off signal of the gate driving circuit, a signal voltage of the data driving circuit is transferred to a corresponding pixel electrode through the data line. An alignment direction of the liquid crystal molecules of the liquid crystal layer of the display panel 810 is changed by an electric field formed between the pixel electrode and a common electrode and light transmitted through the liquid crystal layer is altered according to the applied electric field.

The upper reception member 900 may be arranged on the upper portion of the display panel 810, and the upper reception member 900 may include a bezel portion 930 that surrounds an edge of the display panel 810, and a side portion 910 that surrounds a part of a side wall 510 of a mold frame 500 to be described later.

The backlight unit 10 that supplies light to the rear side of the display panel 810 is provided on the lower portion of the display panel 810.

The backlight unit 10 may include a light guide plate 300, a light source portion 400, and a mold frame 500. The backlight unit 10 may further include a lower reception member 100, a reflection member 200, and an optical sheet 700.

The lower reception member 100 is a portion that receives the light source portion 400 and the light guide plate 300, and may include a side portion 130 that extends substantially perpendicular to the bottom portion from the edge of the bottom portion to form a reception space. The light guide plate 300 may be seated on the bottom portion 110 of the lower reception member 100, and the light source portion 400 may be seated on the inside of the side portion 130 of the lower reception member 100. The lower reception member 100 may be made of a metal having superior strength and low strain or a metal having superior thermal conductivity, but is not limited thereto. Alternatively, the lower reception member 100 may be made of a plastic material.

The light guide plate (LGP) 300 is a portion that changes a path of the light that is generated from the light source portion 400 to the side of the display panel 810, and may include a light incident surface provided on the side surface to make the light generated from the light source portion 400 incident thereto, and a light emission surface 330 that faces the display panel 810. The light guide plate 300 may be made of a polymethyl methacrylate (PMMA) material that is one of light transmission materials or a material having constant refractive index, such as a polycarbonate (PC) material, but is not limited thereto.

Since the light that is incident to one side or both sides of the light guide plate 300 has an angle smaller than a critical angle, it is incident to the inside of the light guide plate 300. The light that is incident to the upper surface or the lower surface of the light guide plate 300 has an angle greater than the critical angle. Accordingly, the light is not emitted to an outside of the light guide plate 300, but is uniformly transferred to the inside of the light guide plate 300.

A scattering pattern (not illustrated) may be formed on any one of the upper surface and the lower surface of the light guide plate 300, for example, on the lower surface that faces the light emission surface 330, so that the guided light is emitted to the upper portion thereof. The scattering pattern may be printed, for example, with ink, on one surface of the light guide plate 300 so that the light transferred from the inside of the light guide plate 300 can be emitted to the upper portion. The scattering pattern may be formed through printing with ink, but is not limited thereto. A fine groove or projection may be formed on the light guide plate 300. The scattering pattern is not limited thereto and various modifications can be made.

The reflection member 200 may be further provided between the light guide plate 300 and the bottom portion 110 of the lower reception member 100. The reflection member 200 serves to reflect the light that is emitted to the lower surface of the light guide plate 300. The reflection member 200 may be in a film shape, but is not limited thereto.

The light source portion 400 may be arranged to face the light incident surface of the light guide plate 300. In the drawing, it is illustrated that two light source portions 400 are provided to be arranged on both opposing side surfaces of the light guide plate 300. However, this is merely exemplary, and according to circumstances, the number of light source portions 400 can be appropriately changed. For example, one light source portion 400 may be provided on one side surface of the light guide plate 300, or three or more light guide plates 300 may also be provided to correspond to three or more side surfaces among the four side surfaces of the light guide plate 300. Further, a plurality of light source portions 400 may be provided to be arranged to correspond to any one of side surfaces of the light guide plate 300.

The light source portion 400 may include a plurality of light sources 430 and a printed circuit board 410 on which the plurality of light sources 430 are mounted to be spaced apart from each other.

The plurality of light sources 430 may be white LEDs that emit white light, or LEDs that emits light of red (R), green (G), and blue (B) colors. If the plurality of light sources 430 are implemented by LEDs that emit the light of red (R), green (G), and blue (B) colors, they may be turned on at the same time to implement the white light through color mixing.

The printed circuit board 410 is a thin substrate on which power supply lines (not illustrated) are formed. The printed circuit board 410 may be formed of a metal core printed circuit board (MCPCB) that includes a metal having superior thermal conductivity. Further, according to circumstances, the printed circuit board 410 may be formed of a flexible printed circuit board (FPCB) having flexibility. The power that is applied from the outside to drive the light sources 430 in the light source portion 400 may be transferred to light assemblies 430 through power supply lines.

The mold frame 500 may be provided with the light guide plate 300, a side wall 510 arranged to surround the light source portion, and an extension portion 540 extending from the side wall 510 to separate the optical sheet 700 and the light guide plate 300 from each other. Further, the side wall 510 may surround not only the light guide plate 300 and the light source portion 400 but also the outline of the side portion 130 of the lower reception portion 100.

The side wall 510 may surround the liquid crystal display 1, and a step height surface 530 may be further formed on an upper side of the side wall 510. Further, the side portion 910 of the upper reception member 900 is seated on a step formed on the outside of the step height surface 530 to reduce the width of the bezel portion 910.

The extension portion 540 may extends inside of the sidewall of the mold frame and support the optical sheet 700 that is seated on the upper portion of the extension portion 540 and to fix a part of the light guide plate 300. An optical pattern sheet (not illustrated) for prevention of light leakage and bright line may be provided on a lower surface of the extension portion 540. The mold frame 500 and the optical pattern sheet will be described in detail later.

The optical sheet 700 is a portion that serves to diffuse and collect the light that passes through the light guide plate 300, and may include a diffusion sheet 710, a prism sheet 730, and a protection sheet 750. Although not illustrated in the drawing, the optical sheet 700 may further include a luminance increasing sheet.

The diffusion sheet 710 may be positioned on the upper portion of the light guide plate 300, and may serve to improve the luminance and the luminance uniformity of the light that is supplied from the light emission surface 330 of the light guide plate 300. The diffusion sheet 710 may be formed by mixing a diffusion material with a transparent resin. The transparent resin material may be made of, for example, acryl or polycarbonate, and the diffusion material may be made of, for example, minute particles, such as polymethyl methacrylate, cross-linked polystyrene, cross-linked sodium polyacrylate, cross-linked silicon, cross-linked acryl-styrene copolymers, calcium carbonate, and barium sulfate. However, the materials of the transparent resin or diffusion material are not limited thereto.

The prism sheet 730 may be positioned on an upper portion of the diffusion sheet 710 to collect the light emitted from the diffusion sheet 710 to a direction of the display panel 810. The prism sheet 730 may include vertical and horizontal prism sheets that collect the light in the vertical and horizontal directions, but is not limited thereto.

The protection sheet 750 may be positioned on the prism sheet 730 to protect a pattern formed on the prism sheet 730.

By the above-described optical sheet 700 the uniformity and luminance of the light that is supplied from the light guide plate 300 may be improved.

Figure 2:
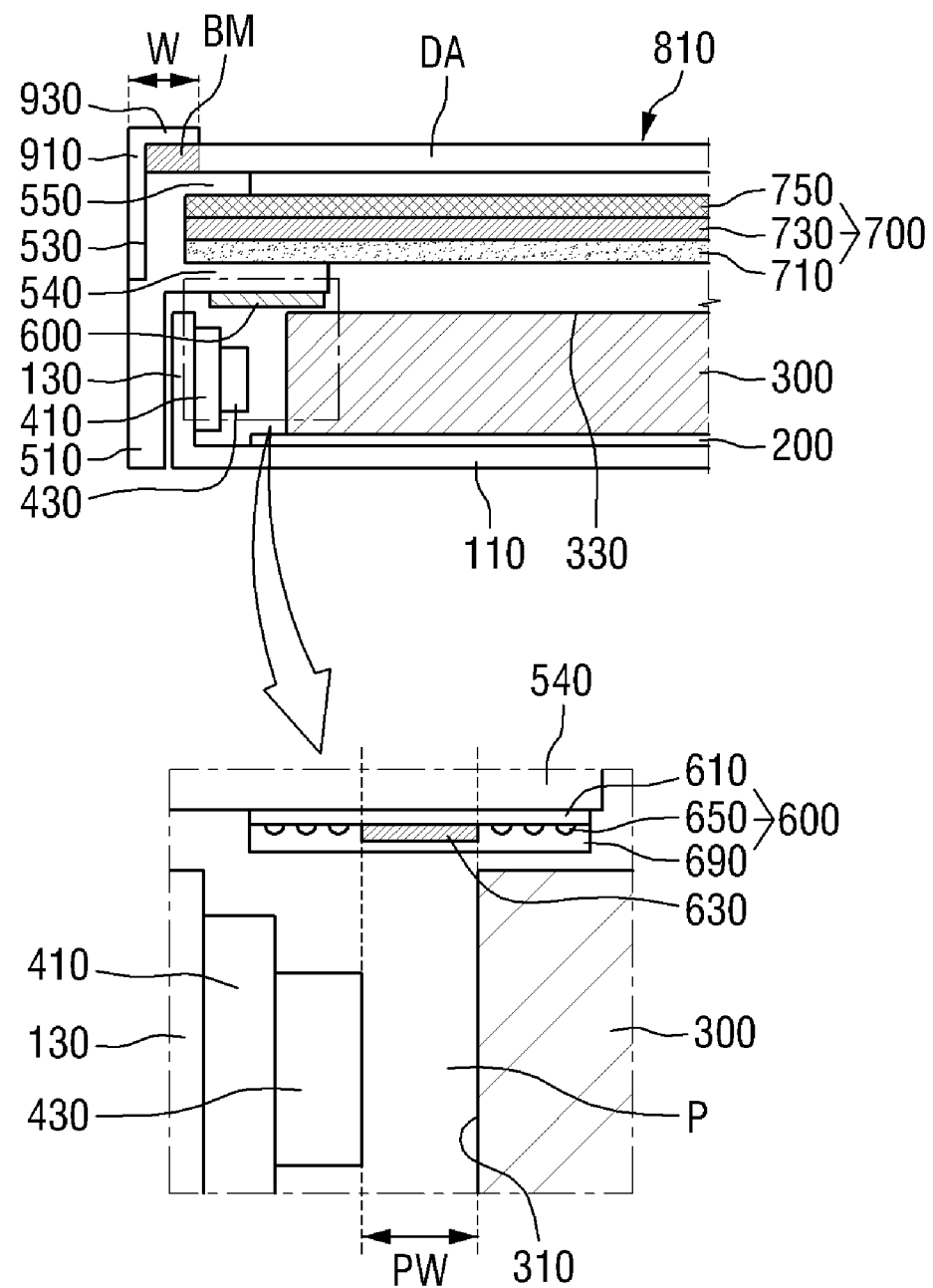
FIG. 2 is a cross-sectional view of a backlight unit and a liquid crystal display, taken along line 11-12 of FIG. 1.
Figure 3A:
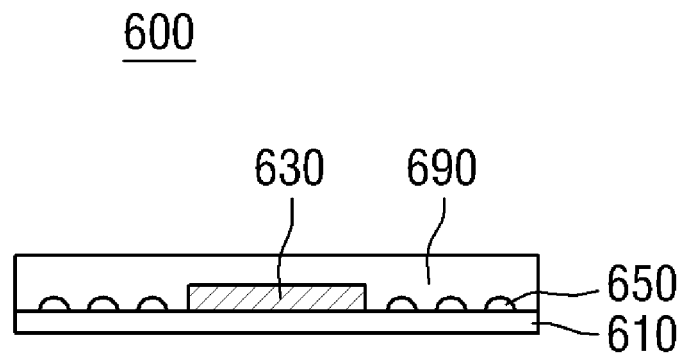
FIGS. 3A and 3B are a cross-sectional view and a plan view of an optical pattern sheet illustrated in FIG. 2 according to an embodiment.
Figure 3B:
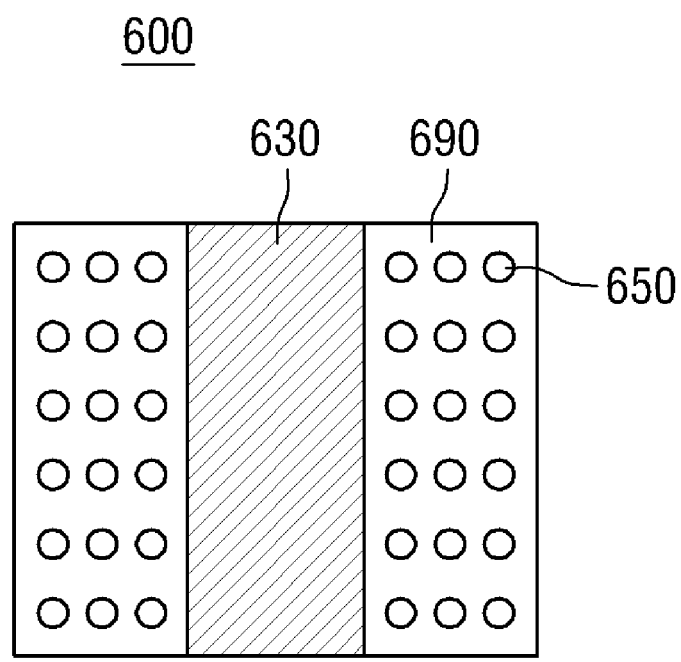

FIG. 2 is a cross-sectional view of a backlight unit and a liquid crystal display, taken along line 11-12 of FIG. 1, and FIGS. 3A and 3B are a cross-sectional view and a plan view of an optical pattern sheet 600 illustrated in FIG. 2 according to an embodiment.

Referring to FIGS. 1 and 2, the mold frame 500 is provided with a side wall 510 that surrounds the outlines of the display panel 810 and the lower reception member 100 to form a side circumference of the liquid crystal display 1.

The extension portion 540 may cover the upper portion of the light source portion, fix a part of the light guide plate 300, and support the optical sheet 700. Specifically, the optical sheet 700 is seated on the upper portion of the extension portion 540, and a part of the upper surface of the light guide plate 300 may be positioned on a lower portion of the extension portion 540.

The mold frame 500 may be made of a resin material, and may be particularly made of a light transmission material that can partially transmit the light. For example, the mold frame 500 may be made of the same material as the diffusion sheet 710, and for example, may be made of a material, such as acryl, polycarbonate (PC), or polymethyl methacrylate (PMMA), but is not limited thereto.

Since the mold frame 500 is formed of a light transmission material like the diffusion sheet 710, the extension portion 540 that covers the upper portion of the light source portion 400 can be prevented from being visually recognized as a dark portion from an outside. Accordingly, the extension portion 540 may be arranged to overlap a display region DA of the display panel 810, and may reduce the width (W) of the non-display region BM or the bezel of the display panel 810. Here, the bezel means a portion measured from the edge of the display region of the display panel 810 to the outermost portion of the liquid crystal display 1.

The mold frame 500 may further include a seat portion 550 extending from the side wall 510. The seat portion 550 may be substantially in parallel to the extension portion 540 to fix the optical sheet 700 and to support the display panel 810. Specifically, the display panel 810 may be seated on an upper portion of the seat portion 550, and the display panel 810 may be fixed by the seat portion 550 and the bezel portion 930 of the upper reception member 900. Further, a part (or edge portion) of the optical sheet 700 may be positioned on a lower portion of the seat portion 550, and the optical sheet 700 may be fixed by the extension portion 540 and the seat portion 550.

The step height surface 530 may be further formed on the outer side of the side wall 510 of the mold frame 500. The side portion 910 of the upper reception member 900 may be seated on the step height surface 530, and the outer surface of the side portion 910 and the outer surface of the side wall 510 may be positioned on substantially the same line. That is, if the step height surface 530 is not formed, the bezel width (W) may be increased by the thickness of the side portion 910, while if the side portion 910 is seated on the step height surface 530, the bezel width (W) can be reduced by the thickness of the side portion 910.

An optical pattern sheet 600 may be positioned on the lower portion of the extension portion 540. The optical pattern sheet 600 is a portion that diffuses or reflects the light emitted from the light source 410, and serves to prevent the occurrence of light leakage, bright line, and dark line between the light source 410 and the light incident surface 310 of the light guide plate 300. The optical pattern sheet 600 may be attached to the lower portion of the extension portion 540 by the medium of adhesives, or the optical pattern sheet 600 may partially or entirely have adhesive property to be attached to the lower portion of the extension portion 540.

Referring to FIGS. 3A and 3B, the optical pattern sheet 600 may include a base film 610 and optical pattern portions 630 and 650 positioned on the base film 610, and may further include a protection layer 690 that is positioned on the base film 610 to bury the optical pattern portions 630 and 650.

The base film 610 may be made of a material having flexibility, and may be made of a light transmission material. For example, the base film 610 may be made of a material, such as polyethyleneterephthalate (PET) or polycarbonate (PC), but is not limited thereto.

The optical pattern portions 630 and 650 may basically have a function not to concentrate the light. That is, the optical pattern portions 630 and 650 do not completely block the light, but perform a function of partial shielding, reflection, and diffusion of the light. Accordingly, the optical characteristics are prevented from being deteriorated and the light is prevented from becoming yellowish.

The optical pattern portions 630 and 650 may include a first pattern 630 and a second pattern 650.

The first pattern may be formed in the form of a line, and may be a shading pattern that performs shielding or reflection of light. The first pattern 630 may include a metal material, and may be formed by printing ink on the base film 610. For example, the first pattern 630 may be formed by printing ink including Al or a mixture of Al and $TiO_2$ on the base film 610.

The second pattern 650 may be a dot pattern, and may be a diffusion pattern that performs light reflection, diffusion, or scattering function. The second pattern 650 may be formed by printing ink on the base film 610. For example, the second pattern 650 may be formed by printing ink including at least one selected from the group consisting of $TiO_2$, $CaCO_3$, $BaSO_4$, $Al_2O_3$, and silicon on the base film 610.

As illustrated in FIG. 3B, the planar shape of the second pattern 650 may be circular, but is not limited thereto. The second pattern 650 may be in the shape of an ellipse, polygon, or any combination thereof.

As illustrated in FIG. 3A, the cross-sectional shape of the second pattern 650 may be semi-elliptical, but is not limited thereto. For example, the cross-section of the second pattern 650 may be in the shape of a semi-circle, polygon, or any combination thereof.

On the other hand, although not illustrated in the drawing, the optical pattern portions 630 and 650 may be overlapped each other. The overlapping pattern may be formed by forming a pattern and printing another pattern on the upper portion of the pattern formed.

For example, in this embodiment, the first pattern 630 and the second pattern 650 may be formed to be overlapped each other. The second pattern 650 may be positioned between the first pattern 630 and the base film 610. Exemplarily, the second pattern 650 may be formed by printing ink including at least one selected from the group including $TiO_2$, $CaCO_3$, $BaSO_4$, $Al_2O_3$, and silicon on the base film 610, and the first pattern 630 may be formed by printing ink including Al or a mixture of Al and $TiO_2$ on a part of the second pattern 650 and the base film 610. In this case, the first pattern 630 and the second pattern 650 may partially overlap each other, and although not illustrated in the drawing, a part of the second pattern 650 may be positioned between the base film 610 and the first pattern 630. The second pattern 650 may be positioned on the first pattern 630. Exemplarily, the first pattern 630 may be formed by printing ink including Al or a mixture of Al and $TiO_2$ on a part of the second pattern 650 including at least one selected from the group including $TiO_2$, $CaCO_3$, $BaSO_4$, $Al_2O_3$, and silicon on the base film 610. In this case, the first pattern 630 and the second pattern 650 may partially overlap each other. It is apparent that such pattern designs can be variously modified in consideration of the light efficiency, strength, and shading rate.

The protection layer 690 protects the optical pattern portions 630 and 650. The protection layer 690 may be made of a transparent resin. The resin may be an acrylic resin, but is not limited thereto.

Referring again to FIG. 2, the optical pattern sheet 600 may be positioned on the lower portion of the extension portion 540, and the optical pattern sheet 600 may be arranged so that the base film 610 faces the lower portion of the extension portion 540.

The first pattern 630 of a line shape may overlap a gap space P between the light source 430 and the light incident surface 310 of the light guide plate 300. The first pattern 630 of a line shape may overlap a gap space P between the light source 430 and the light incident surface 310 of the light guide plate 300. In the drawing, it is illustrated that the width of the first pattern 630 is substantially equal to the width (PW) of the gap space (P). However, the width of the first pattern 630 may be set to be larger than the width (PW) of the gap space (P). By arranging the first pattern 630 that performs light reflection and shading to overlap the gap space (P) in which the light is relatively concentrated, the bright line, in which a specific portion is seen relatively brighter than another portion, and the light leakage can be prevented, and thus the luminance and the picture quality of the liquid crystal display can be prevented from being deteriorated.

Further, since the extension portion 540 overlaps the display region DA of the display device 810 at least partially, the first pattern 630 of the line shape, which is positioned on the lower portion of the extension portion 540, may also overlap the display region DA. That is, the configuration for preventing the bright line and light leakage (e.g., first pattern) can be formed on a portion that overlaps the display region DA, and as a result, the width (W) of the bezel can be reduced.

The second pattern 650 of the dot shape may be positioned on the side portion of the first pattern 630, and the second pattern 650 may partially reflect the incident light and may diffuse or scatter the light that is not reflected but is transmitted. Accordingly, the occurrence of the bright line can be prevented more effectively, and the light is additionally prevented from becoming yellowish. The density or size of the second pattern 650 may be decreased as the distance to the light source 430 becomes farther, but is not limited thereto. Since the explanation of the first pattern 630 and the second pattern 650 is the same as that as described above with reference to FIGS. 3A and 3B, the duplicate explanation thereof will be omitted.

As described above with reference to FIGS. 3A and 3B, the protection layer 690 may be further formed on the base film 610, the first pattern 630, and the second pattern 650. Since the protection layer 690 is formed, the first pattern 630 and the second pattern 650 are prevented from being damaged, and particularly, even if friction occurs between the optical pattern sheet 600 and the light guide plate 300 or the side portion 130 of the lower reception member 100 (in FIG. 1), the first pattern 630 and the second pattern 650 can be prevented from being damaged due to the friction.

Figure 4A:
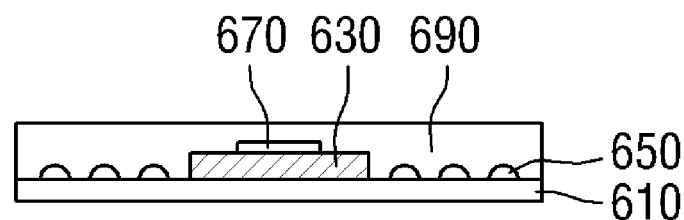
FIGS. 4A and 4B are a cross-sectional view and a plan view of an optical pattern sheet illustrated in FIG. 2 according to another embodiment.
Figure 4B:
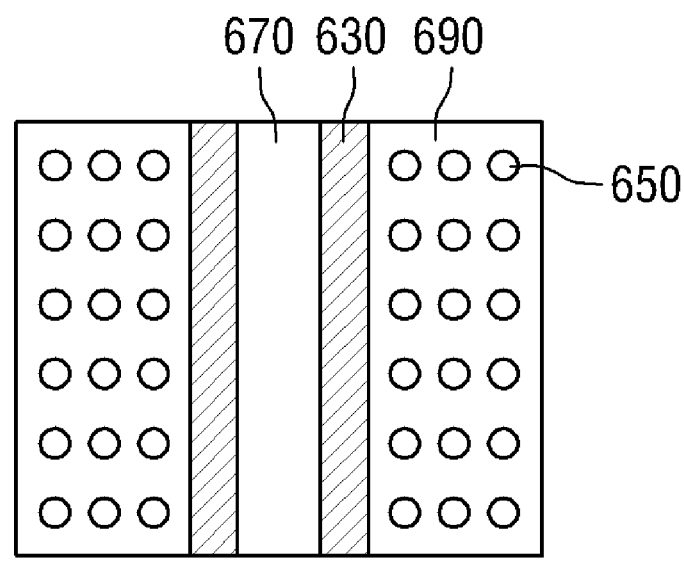

FIGS. 4A and 4B are a cross-sectional view and a plan view of an optical pattern sheet illustrated in FIG. 2 according to another embodiment.

An optical pattern sheet 600-1 according to this embodiment is substantially the same as optical pattern sheet 600 (in FIGS. 3A and 3B). The optical pattern sheet 600-1 according to this embodiment further has a third pattern 651 formed on the first pattern 630. Since the explanation of the base film 610 and the protection layer 690 is the same as that as described with reference to FIGS. 3A and 3B, explanation will be made about the differences between the embodiments.

In this embodiment, the optical pattern sheet 600-1 may include the first pattern 630 as a shading pattern, and may include the second pattern 650 and the third pattern 670 as the diffusion pattern. The third pattern 670 may be positioned on the first pattern 630.

The third pattern 670 may be formed simultaneously with the second pattern 650. For example, the first pattern 630 may be formed by printing ink including Al or a mixture of Al and $TiO_2$ on the base film 610, and then the second pattern 650 and the third pattern 670 may be formed by printing ink including at least one selected from the group including $TiO_2$, $CaCO_3$, $BaSO_4$, $Al_2O_3$, and silicon on the base film 610. That is, as for the order in the manufacturing method, the first pattern 630 is first formed, and then the second pattern 650 and the third pattern 670 may be formed through the same printing process. In this case, the second pattern 650 and the third pattern 670 may be made of the same material.

Further, it is also possible to form the second pattern 650 on the base film 610 through the printing process, and then to form the first pattern 630 and the third pattern 670 in orders. In this case, the second pattern 650 and the third pattern 651 may be made of different materials. For example, the second pattern 650 may include $TiO_2$ having superior refractive index, and the third pattern 670 may include $CaCO_3$ and $TiO_2$, which have superior color sense and optical stability. However, this is merely exemplary, and as described above with reference to FIGS. 3A and 3B, such pattern designs can be variously modified in consideration of the light efficiency, strength, and shading rate.

In relation to the shape of the third pattern 670, FIGS. 4A and 4B illustrate a structure in which the third pattern 670 is formed in a line shape. However, this is merely exemplary, and the third pattern 670 may be in a dot shape that is similar to the shape of the second pattern 650 in addition to the line shape. Further, FIGS. 4A and 4B illustrate that the third pattern 670 is positioned only on the first pattern 630. However, this is merely exemplary, and the third pattern 670 may be further positioned on the upper portion of the second pattern 650.

Figure 5A:
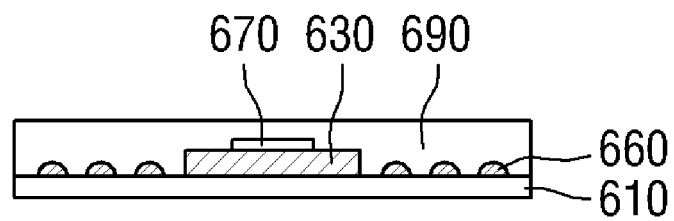
FIGS. 5A and 5B are a cross-sectional view and a plan view of an optical pattern sheet illustrated in FIG. 2 according to still another embodiment.
Figure 5B:
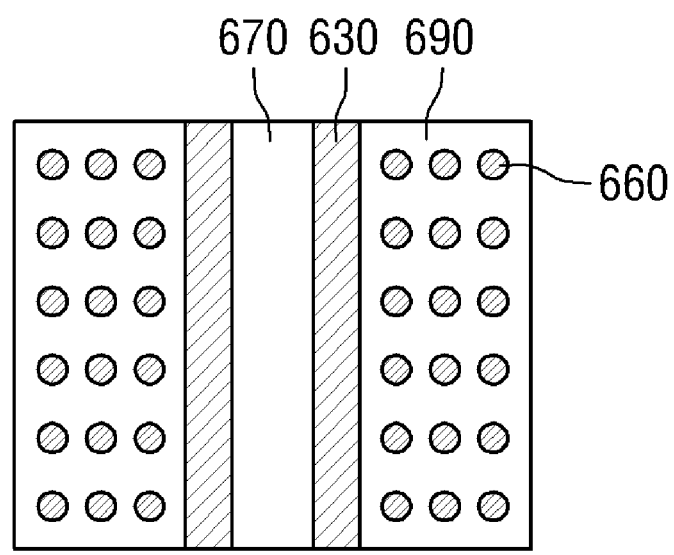

FIGS. 5A and 5B are a cross-sectional view and a plan view of an optical pattern sheet illustrated in FIG. 2 according to still another embodiment.

An optical pattern sheet 600-2 according to this embodiment is similar to the optical pattern sheet 600-1 as illustrated in FIGS. 4A and 4B. However, in this exemplary embodiment, a second pattern 660 functions as a shading pattern. Since the explanation of the base film 610 and the protection layer 690 is the same as that as described with reference to FIGS. 3A and 3B, explanation will be made about the differences between the embodiments.

The optical pattern sheet 600-2 may include the first pattern 630 and the second pattern 660 as the shading patterns, and may include the third pattern 670 as the diffusion pattern. The third pattern 670 may be positioned on the first pattern 630.

The second pattern 660 may be formed simultaneously with the first pattern 630. For example, the first pattern 630 and the second pattern 660 may be simultaneously formed by printing ink including Al or a mixture of Al and $TiO_2$ on the base film 610, and then the third pattern 670 may be formed by printing ink including at least one selected from the group including $TiO_2$, $CaCO_3$, $BaSO_4$, $Al_2O_3$, and silicon on the base film 610. That is, as for the order in the manufacturing method, the first pattern 630 and the second pattern 660 are first formed through the same process, and then the third pattern 670 may be formed. In this case, the first pattern 630 and the second pattern 660 may be made of the same material.

In relation to the shape of the third pattern 670, FIGS. 5A and 5B illustrate a structure in which the third pattern 670 is formed in a line shape. However, this is merely exemplary, and the pattern shape may be variously modified. Further, FIGS. 5A and 5B illustrate that the third pattern 670 is positioned only on the first pattern 630. However, this is merely exemplary, and the third pattern 670 may be further positioned on the upper portion of the second pattern 650.

Figure 6:
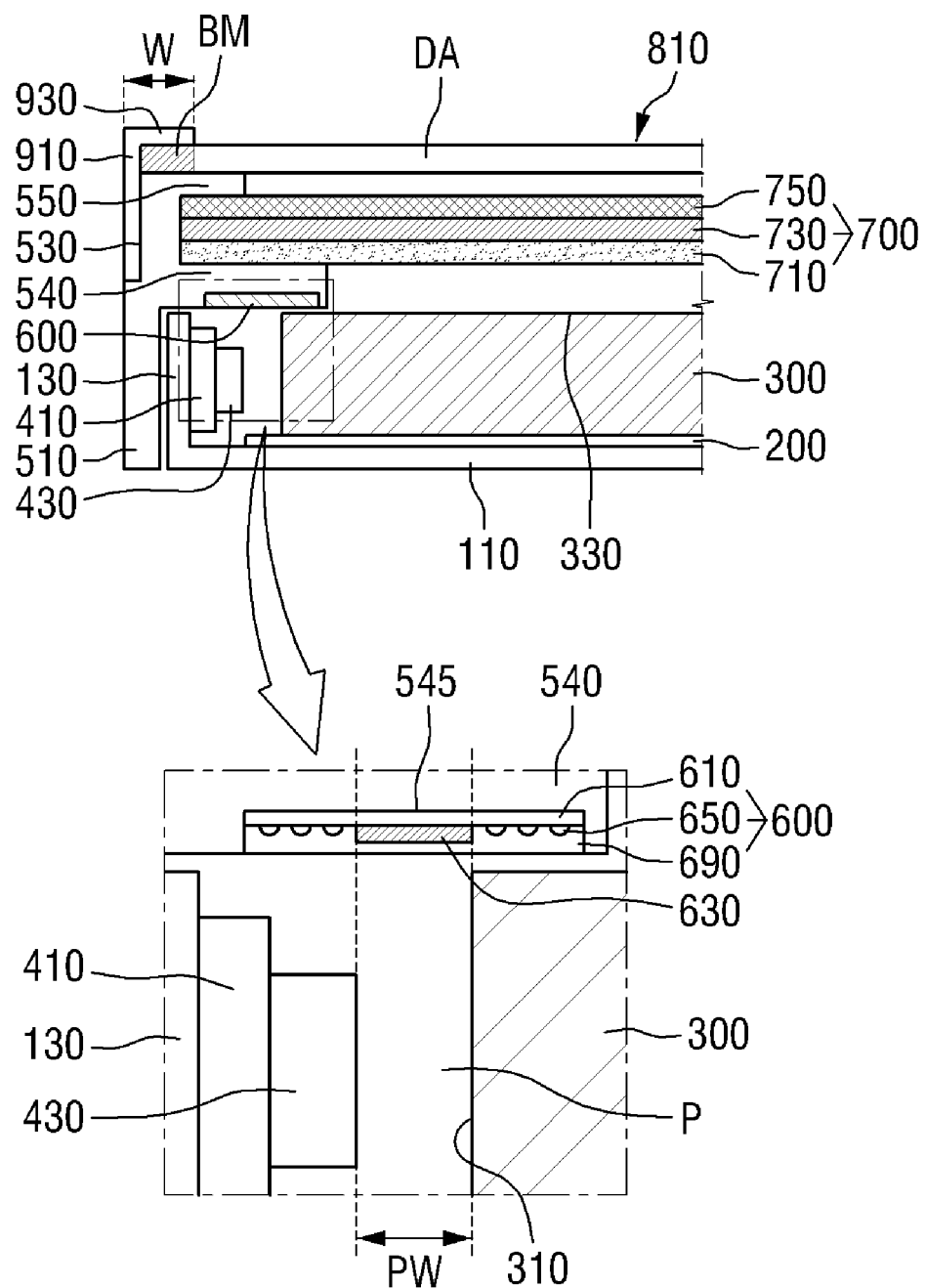
FIG. 6 is a cross-sectional view of a backlight unit and a liquid crystal display according to another embodiment of the inventive concept.

FIG. 6 is a cross-sectional view of a backlight unit and a liquid crystal display according to another embodiment of the inventive concept.

Referring to FIGS. 1, 2, and 6, a backlight unit and a liquid crystal display according to this embodiment have an extension portion 540 having a structure that is partially different from the structure illustrated in FIG. 2. Since the explanation of other configurations is the same as that as described above with reference to FIGS. 1 and 2, the detailed explanation thereof will be omitted.

According to the backlight unit and the liquid crystal display according to this embodiment, a groove 545 that accommodates the optical pattern sheet 600 is formed on the lower portion of the extension portion 540, and the optical pattern sheet 600 is inserted into the groove. Accordingly, in comparison to the structure illustrated in FIG. 2, a space occupied by the optical pattern sheet 600 can be saved, and as a result, the thickness of the liquid crystal display can be further reduced.

Further, since the optical pattern sheet 600 is inserted into the groove 545, friction can be prevented from occurring between the optical pattern sheet 600 and the light guide plate 300 or between the optical pattern sheet 600 and the side portion 130, and thus the optical pattern sheet 600 can be prevented from being damaged. Further, if the groove 545 is formed with a sufficient depth so that the first pattern 630 and the second pattern 650 do not project out of the groove 545, the protection layer 690 may be omitted, and in this case, the material cost can be additionally saved.

Although preferred embodiments of the inventive concept have been described for illustrative purposes, those skilled in the art will appreciate that various modifications, additions and substitutions are possible, without departing from the scope and spirit of the inventive concept as disclosed in the accompanying claims.

What is claimed is:

1. A backlight unit comprising:
   a light guide plate;
   a light source portion arranged adjacent to a side surface of the light guide plate to emit light;
   a mold frame having an extension portion that covers an upper portion of the light source portion and at least a part of an upper portion of the light guide plate; and
   an optical pattern sheet arranged on a lower portion of the extension portion to shade or diffuse incident light,
   wherein the optical pattern sheet does not extend beyond the extension portion in a plan view, and includes a base film and an optical pattern portion disposed on the base film, and
   wherein the optical pattern portion includes a first pattern having an isolated straight line shape and shielding light, and a second pattern disposed on both sides of the first pattern and having a different planar shape than the first pattern; and
   wherein the first pattern includes a metal material, and wherein the second pattern includes at least one of $TiO_2$, $CaCO_3$, $BaSO_4$, $AL_2O_3$, and silicon.

2. The backlight unit of claim 1, wherein a groove is formed on the lower portion of the extension portion, and the optical pattern sheet is seated in the groove.

3. The backlight unit of claim 1, wherein the first pattern and the second pattern overlap each other in a plan view.

4. The backlight unit of claim 3, wherein the first pattern overlaps a gap space between the light source portion and the light guide plate.

5. The backlight unit of claim 3, wherein a planar shape of the second pattern is at least one of a circle, an ellipse, and a polygon.

6. The backlight unit of claim 1, wherein the second pattern is:
   a diffusion pattern that diffuses the incident light.

7. The backlight unit of claim 1, wherein the optical pattern sheet further comprises a protection layer disposed on the base film to bury the optical pattern portion.

8. The backlight unit of claim 1, wherein the mold frame is made of a light transmission material.

9. A liquid crystal display comprising:
   a light guide plate;
   a light source portion arranged adjacent to a side surface of the light guide plate to emit light;
   a mold frame having an extension portion that covers an upper portion of the light source portion, at least a part of an upper portion of the light guide plate and at least a part of the display region;

an optical sheet disposed on the light guide plate and seated on the extension portion;

a display panel positioned on the optical sheet and including a display region and a non-display region; and an optical pattern sheet arranged on a lower portion of the extension portion to shield or diffuse incident light, wherein the optical pattern sheet does not extend beyond the extension portion in a plan view, and includes a base film and an optical pattern portion disposed on the base film, and wherein the optical pattern portion includes a first pattern having an isolated straight line shape and shielding light, and a second pattern disposed on both sides of the first pattern and having a different planar shape than the first pattern; and wherein the first pattern includes a metal material, and wherein the second pattern includes at least one of $TiO_2$, $CaCO_3$, $BaSO_4$, $AL2O_3$, and silicon.

10. The liquid crystal display of claim 9, wherein the first pattern and the second pattern overlap each other in a plan view.

11. The liquid crystal display of claim 10, wherein the first pattern overlaps a gap space between the light source portion and the light guide plate and the display region.

12. The liquid crystal display of claim 9, wherein the mold frame is made of a light transmission material.

\* \* \* \* \*